(12) United States Patent
Leung et al.

(10) Patent No.: US 8,090,828 B2
(45) Date of Patent: Jan. 3, 2012

(54) METHOD AND APPARATUS FOR REUSING DHCP ADDRESSES IN HOME ADDRESSES OF MOBILE IP CLIENTS

(75) Inventors: Kent K. Leung, Mountain View, CA (US); Milind M. Kulkarni, San Jose, CA (US); Alpesh Patel, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1955 days.

(21) Appl. No.: 10/241,969

(22) Filed: Sep. 11, 2002

(65) Prior Publication Data

US 2003/0217145 A1 Nov. 20, 2003

Related U.S. Application Data

(60) Provisional application No. 60/362,251, filed on Mar. 5, 2002.

(51) Int. Cl.
*G06F 15/16* (2006.01)
(52) U.S. Cl. .......................... 709/226; 709/238
(58) Field of Classification Search .................. 709/238, 709/226
See application file for complete search history.

(56) References Cited

U.S. PATENT DOCUMENTS

| | | | |
|---|---|---|---|
| 6,161,123 A * | 12/2000 | Renouard et al. | 709/203 |
| 6,163,843 A * | 12/2000 | Inoue et al. | 726/11 |
| 6,167,513 A * | 12/2000 | Inoue et al. | 713/150 |
| 6,230,012 B1 | 5/2001 | Willkie et al. | |
| 6,233,616 B1 * | 5/2001 | Reid | 709/225 |
| 6,339,830 B1 | 1/2002 | See et al. | 713/202 |
| 6,407,988 B1 | 6/2002 | Agraharam et al. | |
| 6,421,714 B1 * | 7/2002 | Rai et al. | 709/238 |
| 6,427,170 B1 * | 7/2002 | Sitaraman et al. | 709/226 |
| 6,442,616 B1 | 8/2002 | Inoue et al. | |
| 6,463,134 B1 * | 10/2002 | Okada et al. | 379/93.24 |
| 6,473,411 B1 | 10/2002 | Kumaki et al. | |
| 6,515,974 B1 | 2/2003 | Inoue et al. | |
| 6,567,664 B1 | 5/2003 | Bergenwall et al. | |
| 6,636,894 B1 * | 10/2003 | Short et al. | 709/225 |
| 6,654,359 B1 | 11/2003 | La Porta et al. | |

(Continued)

FOREIGN PATENT DOCUMENTS

EP 1126682 A 8/2001

OTHER PUBLICATIONS

S. Glass, "Mobile IP Agents as DHCP Proxies", Internet Draft, Sun Microsystems, Inc., Mar. 2, 2000.

(Continued)

*Primary Examiner* — Ajay Bhatia
(74) *Attorney, Agent, or Firm* — Weaver Austin Villeneuve & Sampson LLP (57) ABSTRACT

Methods and apparatuses for conserving addresses. The invention allows a mobile node to manage its own address, shifting responsibility away from the home agent. The home agent is able to detect when a mobile node has already been assigned an address for use of resources on the network. When the home agent recognizes that the mobile address has already been assigned an address, it allows the mobile node to use its already-assigned address in connection with mobile IP services. Additionally, the mobile node can be notified that it is now responsible for renewing the address.

51 Claims, 4 Drawing Sheets

U.S. PATENT DOCUMENTS

| | | | |
|---|---|---|---|
| 6,687,245 | B2 | 2/2004 | Fangman et al. |
| 6,728,718 | B2 * | 4/2004 | Banerjee et al. ............... 707/10 |
| 6,742,036 | B1 | 5/2004 | Das et al. |
| 6,766,168 | B1 | 7/2004 | Lim |
| 6,771,623 | B2 | 8/2004 | Ton |
| 6,832,263 | B2 | 12/2004 | Polizzi et al. |
| 6,892,069 | B1 | 5/2005 | Flynn |
| 6,954,790 | B2 | 10/2005 | Forslow |
| 6,973,057 | B1 | 12/2005 | Forslow |
| 7,031,275 | B1 | 4/2006 | Borella et al. |
| 7,136,927 | B2 | 11/2006 | Traversat et al. |
| 7,152,117 | B1 | 12/2006 | Stapp et al. |
| 7,353,027 | B2 | 4/2008 | Karagiannis et al. |
| 7,447,162 | B1 * | 11/2008 | Leung et al. ............... 370/252 |
| 2001/0014917 | A1 * | 8/2001 | Ishiyama et al. ............ 709/227 |
| 2001/0046223 | A1 | 11/2001 | Malki et al. |
| 2002/0026527 | A1 * | 2/2002 | Das et al. ............... 709/238 |
| 2002/0073182 | A1 * | 6/2002 | Zakurdaev et al. ........... 709/220 |
| 2002/0089958 | A1 | 7/2002 | Feder et al. |
| 2002/0114323 | A1 | 8/2002 | Chowdhury et al. |
| 2002/0167922 | A1 * | 11/2002 | Inoue et al. ............... 370/331 |
| 2003/0101243 | A1 * | 5/2003 | Donahue et al. ............ 709/226 |
| 2003/0104814 | A1 | 6/2003 | Gwon et al. |
| 2003/0119506 | A1 | 6/2003 | Singhai et al. |
| 2003/0126262 | A1 * | 7/2003 | Yoshida et al. ............. 709/226 |
| 2003/0163728 | A1 | 8/2003 | Shaw |
| 2003/0217145 | A1 * | 11/2003 | Leung et al. ............... 709/224 |
| 2003/0327180 | | 11/2003 | Leung et al. |
| 2003/0224788 | A1 * | 12/2003 | Leung et al. ............ 455/435.1 |
| 2004/0072557 | A1 * | 4/2004 | Paila et al. ............... 455/414.1 |

OTHER PUBLICATIONS

Levkowetz, H. et al., "Mobile IP NAT/NAPT Traversal using UDP Tunneling," Internet Draft, Nov. 2001, 23 pages.

Khalil, Mohamed M. et al., "Generalized NAI (GNAI) Extension for Mobile IPv4," Internet Draft, Oct. 2001, 6 pages.

Adrangi, Farid and Prakash, Iyer, "Mobile IPv4 Traversal Across Firewalls," Internet Draft, Nov. 13, 2001, 30 pages.

Cardellini, V. et al, "Dynamic Load Balancing in Web-Server Systems," IEEE Internet computing, May 1999, XP002170537.

Heissenhuber, F. et al., "Home Agent Redundancy and Load Balancing in Mobile IPV6," Broadband communications, Proceedings of the International IFIP-IEEE Conference on Broadband communications, XX, XX, Nov. 10, 1999, pp. 235-244, XP009002035.

Johnson, D. B. et al, "Mobility support in IPV6," Internet Draft, XX, XX, Jun. 1, 2002, pp. I-V, 1-157, XP0022963720.

International Search Report, Application No. PCT/US03/20106, Mailed Nov. 14, 2003; 4 pages.

"Wireless IP Network Standard," Version 3.0.0, Version Date: Jul. 16, 2001, 62 pages.

Calhoun et al, "Diameter Base Protocol," http://www.ietf.org/internet-drafts/draft-ietf-aaa-diameter-10.txt, Apr. 2002, 139 pages.

Calhoun et al, "Diameter Mobile IPv4 Application," http://www.ietf.org/internet-drafts/draft-ietf-aaa-mobileip-10.txt, Apr. 2002, 48 pages.

U.S. Appl. No. 10/187,084, Leung et al, "Methods and Apparatus for Anchoring of Mobile Nodes Using DNS," filed Jun. 28, 2002.

Examiner's Communication pursuant to Article 96(2) EPC dated Mar. 1, 2006, from related European Patent Application No. 03742214.4, Methods and Apparatus for Anchoring of Mobile Nodes Using DNS, 6 pages.

Giovanardi, *Transparent Mobile IP: an Approach and Implementation*, 1997, IEEE, pp. 1861-1865.

Vipul Gupta and Gabriel Montenegro, "Secure and Mobile Networking", 1998, Kluwer Academic Publishers, Mobile Networks and Applications vol. 3, Issue 4, p. 381-390.

Victor C. Zandy and Barton P. Miller, "Reliable Network Connections", 2002, ACM, Networking Proceedings of the 8th Annual International Conference on Mobile Computing and Networking, p. 95-106.

Jenq-Haur Wang and Tzao-Lin Lee, "Enhanced Intranet Management in a DHCP-Enabled Environment", Aug. 2002, Proceedings of the 26th Annual International Computer Software and Applications Conference (COMPSAC) 2002, p. 893-898.

AU Office Action dated May 8, 2008, from AU Appl. No. 2003279928.

CA Office Action dated Dec. 17, 2008, from CA Appl. No. 2,490,821.

CN Office Action dated Sep. 12, 2008, from CN Appl. No. 03815382.3.

CN 2nd Office Action dated Feb. 27, 2009, from CN Appl. No. 03815382.3.

EP Office Action dated Jun. 5, 2007, from EP Appl. No. 03742214.4.

U.S. Appl. No. 60/362,251, filed on Mar. 5, 2002.

Non-Final Office Action mailed Jul. 24, 2007, from related U.S. Appl. No. 10/187,084.

Final Office Action mailed Oct. 16, 2007, from related U.S. Appl. No. 10/150,377.

Final Office Action mailed Jan. 10, 2008, from related U.S. Appl. No. 10/187,084.

Non-Final Office Action mailed Feb. 6, 2008, from related U.S. Appl. No. 10/150,377.

Notice of Allowance & Allowed Claims dated Jun. 25, 2008, from related U.S. Appl. No. 10/187,084.

Notice of Allowance & Allowed Claims dated Jul. 22, 2008, from related U.S. Appl. No. 10/300,437.

Non-Final Office Action mailed Sep. 4, 2008, from related U.S. Appl. No. 10/150,377.

Final Office Action mailed May 15, 2009, from related U.S. Appl. No. 10/150,377.

* cited by examiner

METHOD AND APPARATUS FOR REUSING DHCP ADDRESSES IN HOME ADDRESSES OF MOBILE IP CLIENTS

CROSS-REFERENCE TO RELATED APPLICATIONS

This application claims the benefit of U.S. Provisional Application No. 60/362,251, filed Mar. 5, 2002, incorporated herein by reference in its entirety and for all purposes. This application is related to Ser. No. 10/150,377, filed May 17, 2002, and Ser. No. 10/187,084, filed Jun. 28, 2002, both of which are incorporated herein by reference in their entireties and for all purposes, and both of which also claim benefit of U.S. Provisional Application No. 60/362,251, filed Mar. 5, 2002.

BACKGROUND OF THE INVENTION

1. Field of the Invention

The present invention relates generally to mobile computing and more specifically to management of addresses for mobile nodes.

2. Description of the Related Art

Mobile IP is a protocol that allows laptop computers and other mobile computer units ("mobile nodes") to roam between various sub-networks while maintaining Internet and/or WAN connectivity. Without Mobile IP or similar protocols a mobile node would be unable to stay connected while roaming from one location serviced by one sub-network to another location being serviced by a different sub-network. This is because each IP address has a field that specifies the particular sub-network on which the node resides. If a user desires to take a computer that is normally attached to one node and roam so that it passes through different sub-networks, the roaming computer cannot use its home base IP address. As a result, a businessperson traveling across the country cannot travel with his or her computer across geographically disparate network segments or wireless nodes while maintaining Internet connectivity. This is not acceptable in the age of portable computational devices.

To address this problem, the Mobile IP protocol has been developed and implemented. An implementation of Mobile IP is described in RFC 3220, "IP Mobility Support for IPv4" of the Network Working Group, C. Perkins, Ed., January 2002. Mobile IP is also described in the text "Mobile IP, The Internet Unplugged" by J. Solomon, Prentice Hall, 1998. Both of these references are incorporated herein by reference in their entireties and for all purposes.

Figure 1:
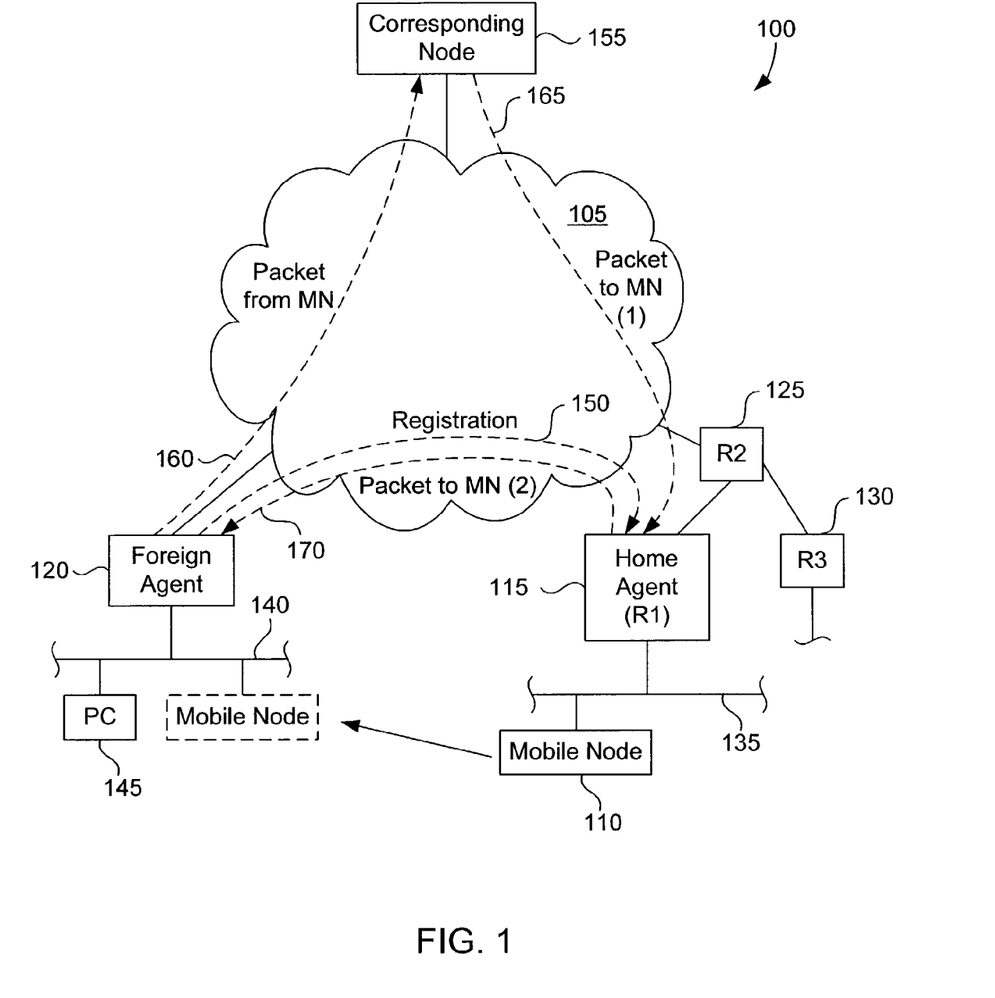
FIG. 1 is a block diagram of a Mobile IP environment.

The Mobile IP process and environment are illustrated in FIG. 1. A Mobile IP environment 100 includes the Internet (or a WAN) 105 over which a mobile node 110 can communicate via mediation by a home agent 115 or a foreign agent 120. Typically, the home agent 115 and foreign agent 120 are routers or other network connection devices performing appropriate Mobile IP functions as implemented by software, hardware, and/or firmware. Note the overall network topology is arbitrary, and elements such as the home agent 115 need not directly connect to the Internet 105. For example, the home agent 115 may be connected through another router R2 125. Router R2 125 may, in turn, connect one or more other routers R3 130 with the Internet 105.

When mobile node 110 is plugged into its home network segment 135 it connects with the Internet 105 through its designated home agent 115. When the mobile node 110 roams, it can be connected to a remote network segment 140 and communicate through the available foreign agent 120. Other nodes, such as a PC 145, on remote network segment 140 also communicate with the Internet 105 through foreign agent 120. Presumably, there are many foreign agents available at geographically disparate locations to allow wide spread Internet connection via the Mobile IP protocol.

Mobile node 110 may identify foreign agent 120 through various agent solicitations and agent advertisements that form part of the Mobile IP protocol. When mobile node 110 engages with remote network segment 140, it composes a registration request for the home agent 115 to bind the mobile node's 110 current location with its home location. Foreign agent 120 then relays the registration request 150 to home agent 115. During the registration process, the home agent 115 and the mobile node 110 may then negotiate the conditions of the mobile node's 110 attachment to foreign agent 120. For example, the mobile node 110 may request a registration lifetime of 5 hours, but the home agent 115 may grant only a 3 hour period. When the negotiation is successfully completed, home agent 115 updates an internal "mobility binding table" which links the mobile node's 110 current location via its care-of address (e.g., a co-located care-of address or the foreign agent's IP address) to the identity (e.g., home address) of the mobile node 110. Further, if the mobile node 110 registered via foreign agent 120, the foreign agent 120 updates an internal "visitor table" which specifies the mobile node address, home agent address, etc. The home agent's 115 association between a mobile node's home base IP address, its current care-of address, and the remaining lifetime of that association is referred to as a binding.

If mobile node 110 wanted to send a message to a correspondent node 155 from its new location, the mobile node 110 would forward a packetized output message 160 through the foreign agent 120 over the Internet 105 to the correspondent node 155 according to standard Internet protocols. However, if the correspondent node 155 wanted to send a message 165 to the mobile node 110—whether in reply to a message from the mobile node 110 or for any other reason—the correspondent node 155 addresses that message to the IP address of the mobile node 110 as if the mobile node 110 were on the home network segment 135. The packets of the message from the correspondent node 155 are forwarded over the Internet 105 to the router R2 125 and ultimately to the home agent 115.

From the home agent's 115 mobility binding table, the home agent 115 recognizes that the mobile node 110 is no longer attached to the home network segment 135. The home agent 115 then encapsulates the packets from correspondent node 155 (which are addressed to the mobile node 110 on the home network segment 135) according to the Mobile IP protocol, and forwards these encapsulated packets 170 to the appropriate care-of address for mobile node 110. If the care-of address is the IP address of the foreign agent 120 the foreign agent 120 strips the encapsulation and forwards the message to the mobile node 110 on the remote network segment 140. The packet forwarding mechanism implemented by the home agent 115 to the foreign agent 120 is often referred to as "tunneling."

As set forth in RFC 3220, the Mobile IP specification, the mobile node 110 can be statically provisioned with its home address or request home address assignment. Home address assignment is typically requested by setting the home address field of the registration request to 0.0.0.0 and using a mobile node network address identifier (NAI) extension to identify itself. NAI is described in RFC 2794 of the Network Working Group, P. Calhoun and C. Perkins, March 2000, incorporated herein by reference in its entireties and for all purposes. After receiving and authenticating such a registration request, the home agent is expected to assign a home address to the mobile node in the registration reply.

One proposal for home address assignment by the home agent is described in the IETF working group draft, "Mobile IP Agents as DHCP Proxies," S. Glass, draft-glass-mobileip-agent-dhcp-proxy-01.txt, Mar. 2, 2000, incorporated herein by reference in its entirety and for all purposes. In that draft, the home agent behaves as a DHCP proxy agent, acting on behalf of the mobile node. However, having the home agent involved in address management (assignment, renewal, release etc) is an overhead, especially in enterprise networks.

SUMMARY OF THE INVENTION

The present invention provides methods and apparatuses for conserving addresses. In one embodiment a mobile node requests an assignment of a first address so that the first address could be used to facilitate the mobile node's use of network resources. For instance, the first address may be an address allocated by a DCHP server. The mobile node also requests an assignment of a second address so that the second address could be used to facilitate the mobile node's ability to maintain connectivity while roaming. For instance, the request for assignment of the second address may be a Mobile IP registration request requesting a home address as the second address. The mobile node then uses a single address as both the first address and the second address In another embodiment a home agent receives a request for assignment of a first address. The home agent then routes the request for assignment to a server that can satisfy the request. The home agent also receives a request for assignment of a second address. The home agent then recognizes that the request for assignment of the first address and the request for assignment of the second address came from a single device. The home agent would then alert the single device to use a single address to satisfy both requests.

DETAILED DESCRIPTION OF THE PREFERRED EMBODIMENTS

In the following description, numerous specific details are set forth to provide a thorough understanding of the present invention. It will be obvious, however, to one skilled in the art that the present invention may be practiced without some or all of these specific details. In other instances, well known process steps have not been described in detail in order to avoid unnecessarily obscuring the present invention.

When a mobile node first connects to a network, it is assigned an IP address so that it can access network resources. The present invention allows a mobile node to use the same IP address initially assigned to it for mobile IP purposes. As a consequence, the mobile node can manage its own address, removing the burden of management from the home agent. Moreover, the home agent need not assign an additional address to the mobile node, thereby conserving IP addresses.

Figure 2:
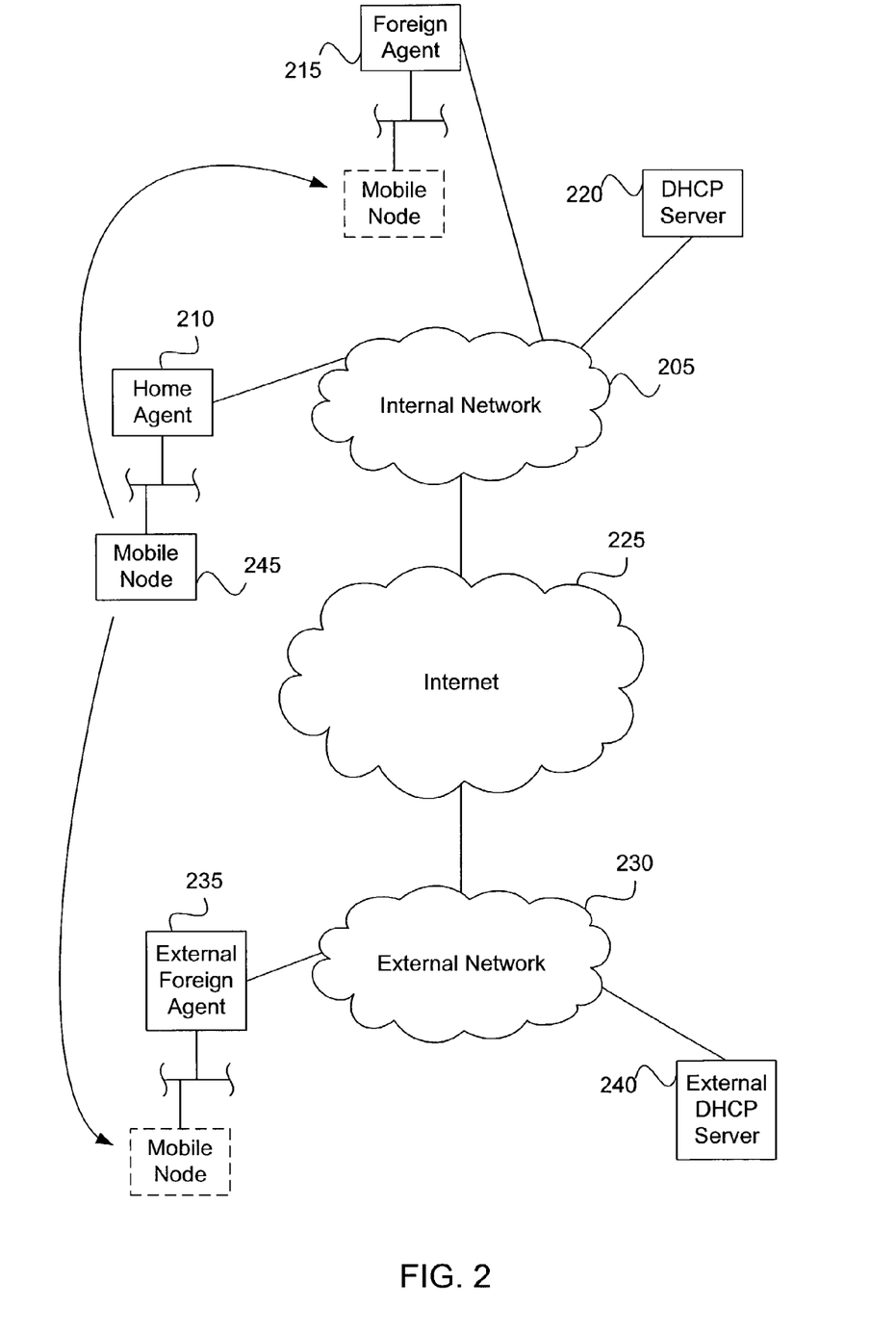
FIG. 2 is a block diagram illustrating an exemplary environment in which the present invention may be implemented.

FIG. 2 is a block diagram illustrating an exemplary environment in which the present invention may be implemented. An internal network 205, having a home agent 210, a foreign agent 215 and a Dynamic Host Configuration Protocol (DHCP) server 220 is connected to the Internet 225, which is connected to an external network 230, having an external foreign agent 235 and an external DHCP server 240.

DHCP is based on the Bootstrap Protocol (BOOTP), an Internet protocol that enables a diskless workstation to discover its own IP address. DHCP is described in RFC 2131 of the Network Working Group, R. Droms, March 1997, and BOOTP is described in RFC 951 of the Network Working Group, B. Croft, September 1985, both references incorporated herein by reference in their entirety and for all purposes. RFC 2131 defines a DHCP server as a host that provides initialization parameters through DHCP. Essentially, a DHCP server allows IP addresses to be dynamically assigned to devices on a network. Dynamic addressing simplifies network administration because the software keeps track of IP addresses rather than requiring an administrator to statically provision the IP address for every device on the network. Current Microsoft Windows® operating systems have integrated DHCP client support.

Referring back to FIG. 2, once a mobile node 245 with Microsoft Windows® boots up it must obtain an IP address from a DHCP server. If the mobile node 245 boots up in the internal network 205 (i.e., on either the home agent's 210 or the foreign agent's 215 network segment), the internal DHCP server 220 will be responsible for assigning an initial IP address. If the mobile node 245 boots up in the external network 230 (i.e., on the external foreign agent's 235 network segment), the external DHCP server 240 will assign the mobile node 245 its initial IP address. Only after it obtains an address can the mobile node 245 begin Mobile IP registration.

Figure 3:
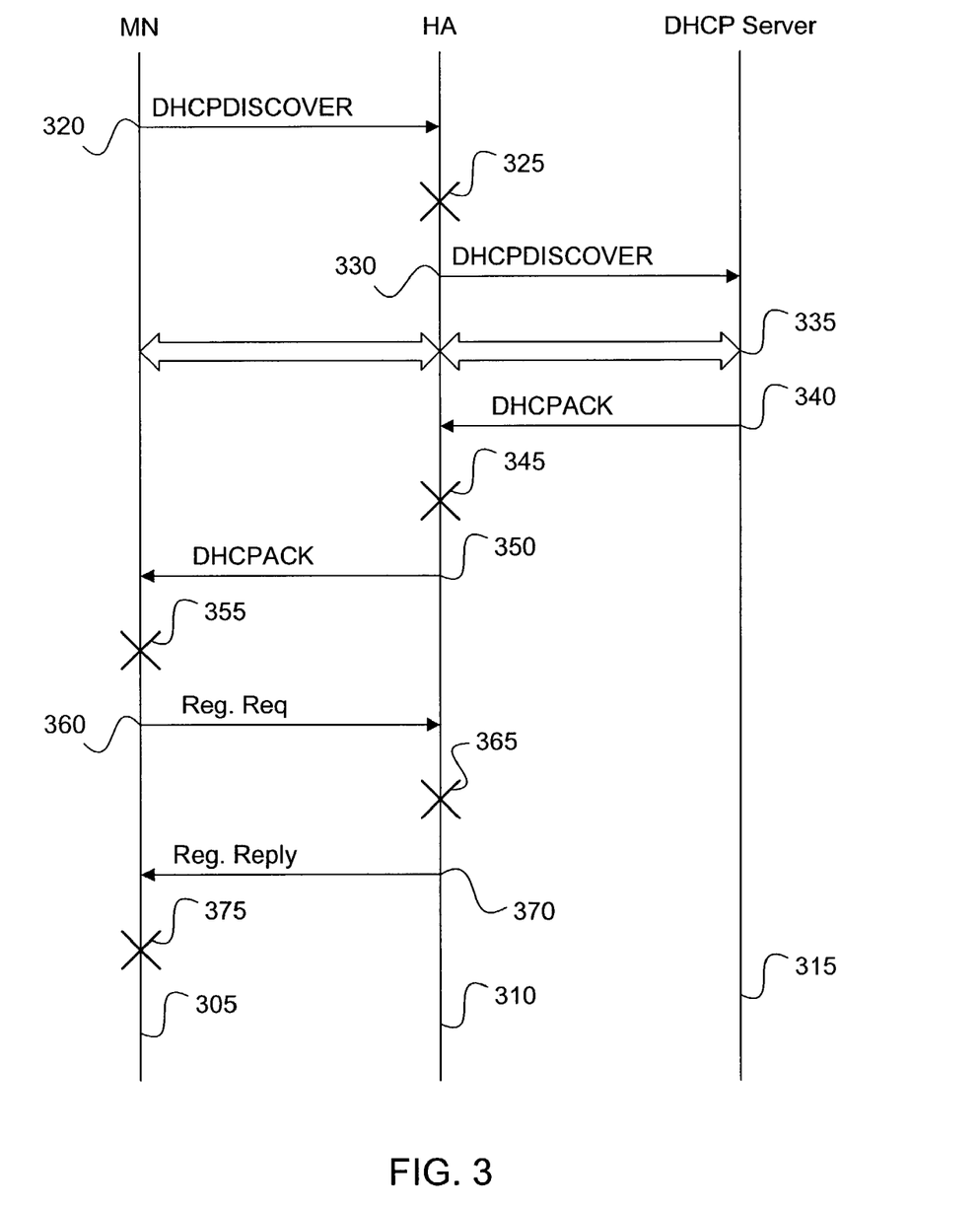
FIG. 3 is a control flow diagram illustrating a method of allowing a mobile node to use the same IP address it was initially assigned with DHCP for Mobile IP purposes when the mobile node boots up on the home agent's network segment.

FIG. 3 is a control flow diagram illustrating a method of allowing a mobile node to use the same IP address it was initially assigned with DHCP for Mobile IP purposes when the mobile node 230 boots up on the home agent's 210 network segment. Steps performed by the mobile node 230, the home agent 210 and DHCP server 220 are represented by corresponding vertical lines 305, 310, and 315.

At 320 the mobile node 230 attempts to locate DHCP services by sending a broadcast (DHCPDISCOVER) to the home agent 210. Although the mobile node 230 cannot include an IP address in the DHCP discover packet (an IP address has not yet been assigned) it can include its link-layer address. A link-layer address is defined in RFC 3220 as, "The address used to identify an endpoint of some communication over a physical link. Typically, the Link-Layer address is an interface's Media Access Control (MAC) address."

At 325 the home agent 210, in its capacity as a DHCP/BOOTP relay agent, processes the DHCPDISCOVER, which includes substituting its own IP address into the DHCPDISCOVER message and noting the interface from which the DHCPDISCOVER originated. At 330 the home agent 210 relays the DHCPDISCOVER message to the DHCP server 220.

At 335 the DHCP server 220 performs its standard authentications and negotiations with the mobile node 230, via the home agent 210, as required by RFC 2131. At 340 the DHCP server 220 sends its acknowledgement (DHCPACK) to the home agent 210. The DHCPACK contains all the necessary configuration parameters for the mobile node 245 including the IP address and link-layer address mapping.

At 345 the home agent 210 recognizes the DHCPACK message and optionally maintains a mapping between the DHCP allocated IP address and the link-layer address. For instance, in one embodiment, the home agent 210 caches the IP address, link-layer address mapping and interface information. Several options are available for maintenance of the cached information. In one embodiment, the mapping is kept in a table until the table is filled up, and then the oldest entries are replaced by newer entries. Therefore, if the table could, for example, hold 1000 entries, the 1001st entry would replace the first entry. Additionally, when the mobile node 245 renews its lease on its IP address, the more recent DCHPACK could replace the older mapping.

At 350 the home agent 210 forwards the DHCPACK message to the mobile node 245. At 355 the mobile node processes the DHCPACK and obtains the IP address assigned by the DHCP server 220 from the DHCPACK. In addition, the mobile node may also obtain the lease time associated with the IP address from the DHCPACK so the mobile node can manage the IP address and associated lease time.

As per RFC 3220, when the mobile node sends a registration request, the mobile node can indicate that it is requesting a home address by setting the home address field of the registration request to zero and by identifying itself in an NAI extension.

At 360 the mobile node 245 sends a registration request that requests a home agent and home address assignment. In one embodiment, a generic home agent domain name (e.g., ha.cisco.com) is additionally provided in a generalized network access identifier extension (GNAIE). The GNAIE is fully described in the IETF working group draft "Generalized NAI (GNAI) Extension for Mobile IPv4," Khalil, M., Qaddoura, E, Akhtar, H., and Calhoun, P., draft-ietf-mobileip-gnaie-05.txt, October 2001, incorporated herein by reference in its entirety and for all purposes.

At 365 the home agent 210 recognizes the message as a Mobile IP registration request coming from a mobile node that previously received a DHCP address assignment. In embodiments where the cached table is used, the source address in the registration request and/or the interface that the registration request arrived from can be checked against the cached table of entries to determine if the mobile node 245 was previously assigned an IP address. Alternatively, the home agent 210 can recognize that it is in the same domain (e.g., cisco.com) as the domain specified in the NAI. Other extensions could also be appending to the registration request that signal the mobile node's ability to manage its own address. In other embodiments, the home agent 210 would recognize the source IP address as being on the same network as the home agent 210. In yet other embodiments, the home agent 210 would recognize that the registration request originated from one of its own interfaces.

Once the home agent 210 determines that the mobile node 245 was assigned a DHCP address, it would then process the registration request normally. At 370 the home agent 210 would send a registration reply to the mobile node 245, setting the home address field of the registration reply equal to the DHCP address. In addition, the NAI extension and GNAIE extension may also be appended to the registration reply.

At 375 the mobile node 245 recognizes that it is in charge of its own address management using DHCP. One mechanism that can be used to alert the mobile node 245 that it is in charge of managing its own address and associated lease time is by the home agent 210 appending a special extension to the registration reply. Another mechanism could be for the mobile node to compare its DHCP address with the home agent address in the registration reply.

The mobile node 245, therefore, does not discard the original DHCP information. Additionally, when it is time for the mobile node 245 to renew its lease on the DHCP address, it will send the appropriate renewal message (DHCPREQUEST). Since the DHCPREQUEST is a standard IP packet it will be routed as any other IP packet. Therefore, if the mobile node 245 roamed to the foreign agent 215, the foreign agent would reverse tunnel the message to the home agent 210, and the home agent 210 will route the DHCPREQUEST to the DHCP server 220 normally. Similarly, the home agent 210 would tunnel the DHCP server's 220 responses as normal IP packets back to the foreign agent 215, for routing to the mobile node 245. If the home agent 210 is maintaining a table, it could update its entries based on any DHCPACK received from renewal requests.

As one skilled in the art will appreciate, the mobility bindings also need to be periodically refreshed according to the Mobile IP protocol. Using any of the techniques described in connection with 365, the home agent 210 could recognize that the mobile node 245 is managing its own IP address. The home agent 210 would process the request normally, except it would not attempt to manage the mobile node's 245 IP address allocated by the DHCP server.

Additionally, it should be appreciated that if the mobile node 245 does not roam from its home agent 210 the Mobile IP protocol treats the mobile node 245 as a stationary node, without making use of any other Mobile IP functionality. However, the mobile node 245 caches information about its home agent 210 until it is powered off, allowing it to roam at a later time. Therefore, if the mobile node 245 receives an agent advertisement from the home agent 210, it will deregister in accordance with Mobile IP protocol. Since routing will allow traffic to be sent to and from the mobile node 245 while it is attached to its home agent 210, the invention does not require any further modifications to Mobile IP processing when the mobile node 245 acts as a stationary node.

If the mobile node 245 boots up in an external foreign agent's 235 service provider network (See FIG. 2), it registers with the home agent 210, and home address assignment can be performed as per the description in the previously mentioned "Mobile IP Agents as DHCP Proxies." This implementation can be optimized so that home agents are centralized when the mobile node 245 is registering from the external network 230. Thus, even if the mobile node 245 roams back to the internal network 205, the home agent 210 will continue to act as a proxy for the mobile node 245 and the mobile node 245 will not deregister until it power offs.

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, home agents, and foreign agents of this invention may be implemented in specially configured routers, switches or servers, such as specially configured router models 2600, 3200, 3600, 4500, 7200, and 7500 available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 4:
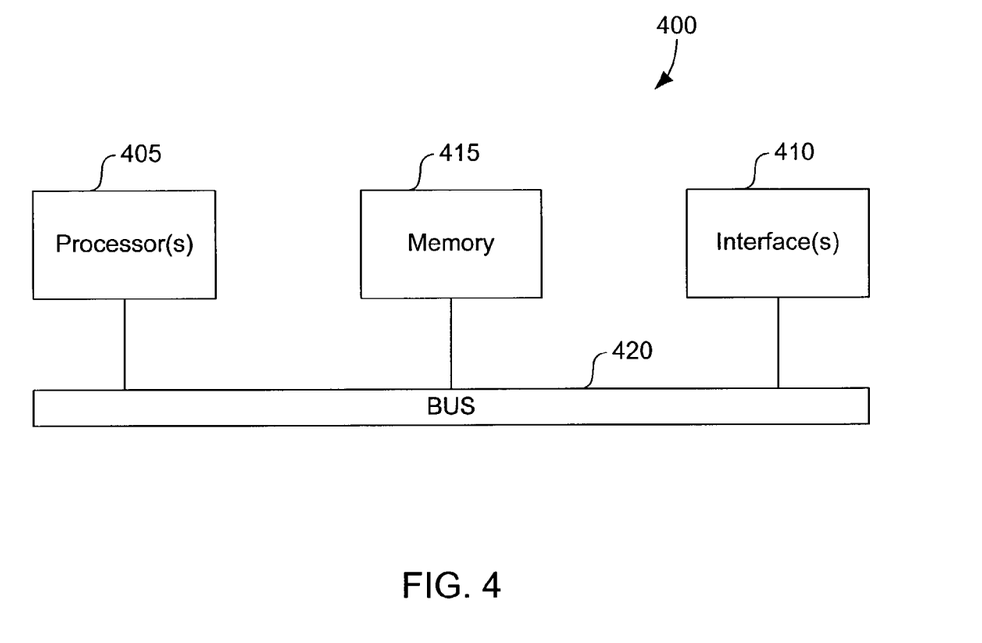
FIG. 4 is a diagram illustrating an exemplary network device in which various embodiments of the invention may be implemented.

Referring now to FIG. 4, a network device 400 suitable for implementing the techniques of the present invention includes a master central processing unit (CPU) 405, interfaces 410, memory 415 and a bus 420. When acting under the control of appropriate software or firmware, the CPU 405 may be responsible for implementing specific functions associated with the functions of a desired network device. For example, when configured as an intermediate router, the CPU 405 may be responsible for analyzing packets, encapsulating packets, and forwarding packets for transmission to a set-top box. The CPU 405 preferably accomplishes all these functions under the control of software including an operating system (e.g. Windows NT), and any appropriate applications software.

CPU 405 may include one or more processors such as those from the Motorola family of microprocessors or the MIPS family of microprocessors. In an alternative embodiment, the processor is specially designed hardware for controlling the operations of network device 400.

The interfaces 410 are typically provided as interface cards (sometimes referred to as "line cards"). Generally, they control the sending and receiving of data packets over the network and sometimes support other peripherals used with the network device 400. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the CPU 405 to efficiently perform routing computations, network diagnostics, security functions, etc.

Although the system shown in FIG. 4 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, the memory 415) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as being configured to comply with Mobile IP standards in force as of the time this document was written. However, it should be understood that the invention is not limited to such implementations. Accordingly, the present embodiments are to be considered as illustrative and not restrictive, and the invention is not to be limited to the details given herein, but may be modified within the scope and equivalents of the appended claims.

What is claimed is:

1. In a network device supporting Mobile IP, a method of conserving addresses comprising:
    receiving by the network device a request for assignment of a first address from a mobile node supporting Mobile IP;
    routing by the network device the request for assignment to a server that can satisfy the request;
    receiving by the network device a request for assignment of a second address from the mobile node, wherein the second address is to be used as a home address to facilitate the mobile node's ability to maintain connectivity while roaming in a network using the Mobile IP protocol, thereby enabling data packets addressed to the second address to be received by the mobile node;
    recognizing by the network device that the request for assignment of the first address and the request for assignment of the second address came from a single device, wherein the single device supports Mobile IP; and
    alerting by the network device the mobile node to use a single address to satisfy both requests;
    wherein recognizing includes analyzing an extension accompanying the request for assignment of the second address;
    wherein the extension is a GNAIE.

2. The method as recited in claim 1, further comprising; providing the first address to the mobile node.

3. The method as recited in claim 2, wherein the first address is a DHCP address received from a DHCP server, the method further comprising:
    receiving a lease time associated with the DHCP address from the DHCP server; and
    providing the lease time associated with the DHCP server to the mobile node.

4. The method as recited in claim 3, further comprising:
sending a registration reply to the mobile node, wherein the registration reply indicates that the mobile node is to manage the DHCP address and the lease time associated with the DHCP address.

5. The method as recited in claim 1, further comprising:
receiving a Mobile IP registration request including the first address, the first address being a DHCP address; and
processing the Mobile IP registration request such that a binding is maintained between the mobile node and the DHCP address.

6. The method as recited in claim 5, further comprising:
obtaining the DHCP address from the Mobile IP registration request;
setting the home address field of a Mobile IP registration reply to the DHCP address; and
sending the Mobile IP registration reply to the mobile node.

7. The method as recited in claim 1, wherein the network device is a home agent, wherein the first address is a DHCP address and the second address is a home address, the method further comprising:
determining whether the mobile node and the home agent are in the same domain; and
wherein alerting by the network device the mobile node to use a single address to satisfy both requests includes sending a Mobile IP registration reply indicating that the mobile node is to use the DHCP address as the home address;
wherein sending the Mobile IP registration reply indicating that the mobile node is to use the DHCP address as the home address is performed when it has been determined that the mobile node and the home agent are in the same domain.

8. The method as recited in claim 5, wherein the first address is a DHCP address, the method further comprising:
maintaining a mapping between the DHCP address and a link-layer address associated with the mobile node.

9. The method as recited in claim 1, wherein the first address is to be used by the mobile node to facilitate the single device's use of network resources.

10. The method as recited in claim 1, wherein recognizing further comprises analyzing the source of the request for assignment of the second address.

11. The method as recited in claim 1, further comprising storing information relating to the request for assignment of the first address.

12. The method as recited in claim 11, wherein recognizing is accomplished by comparing information relating to the request for assignment of the second address with the stored information.

13. The method as recited in claim 1, further comprising sending a Mobile IP registration reply to the mobile node in response to the request for assignment of the second address.

14. The method as recited in claim 13, wherein alerting is accomplished by appending an extension to the Mobile IP registration reply.

15. The method as recited in claim 13, wherein alerting is accomplished by assigning the single address to the second address in the Mobile IP registration reply and allowing the mobile node to compare the assigned first address with the assigned second address.

16. The method as recited in claim 15, wherein the single address is the first address.

17. The method as recited in claim 16, wherein the first address is an address assigned by a DHCP server.

18. The method as recited in claim 13, wherein alerting is accomplished by setting the home address field of the Mobile IP registration reply to the single address.

19. The method of claim 1, wherein the mobile node initiates its own renewal procedures.

20. The method as recited in claim 1, wherein the network device is a Home Agent.

21. A mobile IP network device comprising:
a processor;
memory, operably connected with the processor; and
a network interface, operably connected with the processor;
wherein at least one of the processor or the memory are adapted for:
receiving a request for assignment of a first address;
routing the request for assignment to a server that can satisfy the request;
receiving a request for assignment of a second address, wherein the second address is to be used as a home address by a mobile node to facilitate the mobile node's ability to maintain connectivity while roaming, thereby enabling the mobile node to receive data packets addressed to the second address;
recognizing that the request for assignment of the first address and the request for assignment of the second address came from a single device, the single device supporting Mobile IP; and
alerting the mobile node to use a single address to satisfy both requests;
wherein recognizing includes analyzing an extension accompanying the request for assignment of the second address;
wherein the extension is a GNAIE.

22. The mobile IP network device as recited in claim 21, wherein the first address is to be used by the mobile node to facilitate the single device's use of network resources.

23. The mobile IP network device as recited in claim 21, wherein recognizing is accomplished by analyzing the source of the request for assignment of the second address.

24. The mobile IP network device as recited in claim 21, wherein the processor is operable to further perform instructions that include storing information relating to the request for assignment of the first address.

25. The mobile IP network device as recited in claim 24, wherein recognizing is accomplished by comparing information relating to the request for assignment of the second address with the stored information.

26. The mobile IP network device as recited in claim 21, wherein the processor is operable to further perform instructions that include sending a Mobile IP registration reply to the mobile node in response to the request for assignment of the second address.

27. The mobile IP network device as recited in claim 26, wherein alerting is accomplished by appending an extension to the Mobile IP registration reply.

28. The mobile IP network device as recited in claim 26, wherein alerting is accomplished by assigning the single address to the second address in the Mobile IP registration reply and allowing the mobile node to compare the assigned first address with the assigned second address.

29. The method as recited in claim 28, wherein the single address is the first address.

30. The method as recited in claim 29, wherein the first address is an address assigned by a DHCP server.

31. The mobile IP network device as recited in claim 26, wherein alerting is accomplished by setting the home address field of the registration reply to the single address.

32. The mobile IP network device of claim 21, wherein the mobile node initiates its own renewal procedures.

33. A computer program product comprising:
a non-transitory computer usable medium having computer readable code embodied therein, the computer readable code including computer code for
receiving by the network device a request for assignment of a first address from a mobile node supporting Mobile IP;
routing by the network device the request for assignment to a server that can satisfy the request;
receiving by the network device a request for assignment of a second address from the mobile node, wherein the second address is to be used as a home address to facilitate the mobile node's ability to maintain connectivity while roaming in a network using the Mobile IP protocol, thereby enabling data packets addressed to the second address to be received by the mobile node;
recognizing by the network device that the request for assignment of the first address and the request for assignment of the second address came from a single device, wherein the single device supports Mobile IP; and
alerting by the network device the mobile node to use a single address to satisfy both requests;
wherein recognizing includes analyzing an extension accompanying the request for assignment of the second address;
wherein the extension is a GNAIE.

34. The computer program product as recited in claim 33, wherein recognizing further comprises computer code for analyzing the source of the request for assignment of the second address.

35. The computer program product as recited in claim 33, wherein the computer readable code includes computer code for storing information relating to the request for assignment of the first address.

36. The computer program product as recited in claim 35, wherein recognizing further comprises computer code for comparing information relating to the request for assignment of the second address with the stored information.

37. The computer program product as recited in claim 33, wherein the computer readable code includes computer code for sending a Mobile IP registration reply to the mobile node in response to the request for assignment of the second address.

38. The computer program product as recited in claim 37, wherein alerting is accomplished by appending an extension to the Mobile IP registration reply.

39. The computer program product as recited in claim 37, wherein alerting is accomplished by assigning the single address to the second address in the Mobile IP registration reply and allowing the mobile node to compare the assigned first address with the assigned second address.

40. The method as recited in claim 39, wherein the single address is the first address.

41. The method as recited in claim 40, wherein the first address is an address assigned by a DHCP server.

42. The computer program product as recited in claim 37, wherein alerting is accomplished by setting the home address field of the registration reply to the single address.

43. The computer program product of claim 33, wherein the mobile node initiates its own renewal procedures.

44. A Home Agent supporting Mobile IP, comprising:
means for receiving a request for assignment of a first address;
means for routing the request for assignment to a server that can satisfy the request;
means for receiving a request for assignment of a second address, wherein the second address is to be used as a home address by a mobile node to facilitate the mobile node's ability to maintain connectivity while roaming, thereby enabling the mobile node to receive data packets addressed to the second address;
means for recognizing that the request for assignment of the first address and the request for assignment of the second address came from a single device, the single device supporting Mobile IP, wherein the means for recognizing analyzes an extension accompanying the request for assignment of the second address, wherein the extension is a GNAIE; and
means for alerting the mobile node to use a single address to satisfy both requests.

45. The Home Agent as recited in claim 44, wherein the mobile node initiates its own renewal procedures.

46. The Home Agent as recited in claim 44, wherein the first address is an address assigned by a DHCP server.

47. The Home Agent as recited in claim 44, wherein the single address is the first address.

48. The Home Agent as recited in claim 44, further comprising:
means for sending a Mobile IP registration reply to the mobile node in response to the request for assignment of the second address.

49. The Home Agent as recited in claim 48, wherein the means for alerting comprises means for appending an extension to the Mobile IP registration reply.

50. The Home Agent as recited in claim 48, wherein the means for alerting comprises means for assigning the single address to the second address in the Mobile IP registration reply and means for allowing the mobile node to compare the assigned first address with the assigned second address.

51. The Home Agent as recited in claim 48, wherein the means for alerting comprises means for setting the home address field of the registration reply to the single address.

\* \* \* \* \*